UNITED STATES PATENT OFFICE.

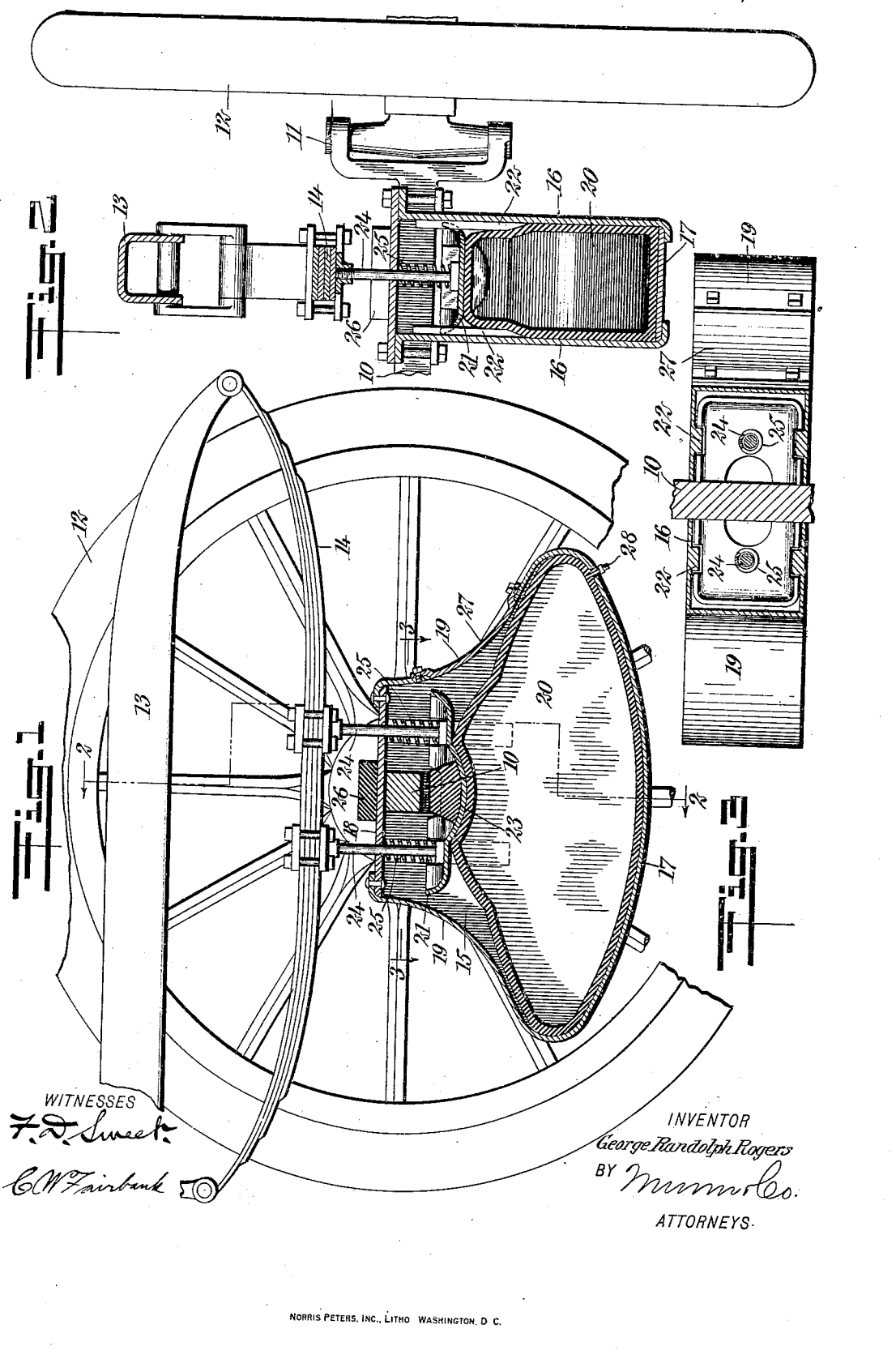

GEORGE R. ROGERS, OF NEW YORK, N. Y.

SHOCK-ABSORBER.

No. 910,863.  Specification of Letters Patent.  Patented Jan. 26, 1909.

Application filed March 17, 1908. Serial No. 421,640.

*To all whom it may concern:*

Be it known that I, GEORGE RANDOLPH ROGERS, a citizen of the United States, and a resident of the city of New York, borough of Manhattan, in the county and State of New York, have invented a new and Improved Shock-Absorber, of which the following is a full, clear, and exact description.

This invention relates to certain improvements in shock absorbers adapted for use on vehicles, and more particularly to that type of shock absorber including an inflated pneumatic cushion acting in conjunction with the springs of the vehicle.

The object of the invention is to provide a pneumatic cushion and inclosing casing therefor, so constructed as to render the absorber readily adaptable to any form of vehicle already in use.

A further object is to so construct the cushion and plunger that varying portions of the former engage with the latter as the pressure is varied.

Reference is to be had to the accompanying drawings, forming a part of this specification, in which similar characters of reference indicate corresponding parts in all the figures, and in which—

Figure 1 is a vertical section through a portion of a vehicle provided with my improved shock absorber; Fig. 2 is a vertical section on the line 2—2 of Fig. 1; and Fig. 3 is a horizontal section on the line 3—3 of Fig. 1.

In the accompanying drawings, I have illustrated my improved shock absorber as applied to a vehicle having an axle 10, connected by a steering knuckle 11 to a wheel 12, and the chassis 13 is connected to the axle by the ordinary steel spring 14. My improved shock absorber includes a metal casing 15, inclosing a portion of the axle and depending therefrom. The casing is provided with substantially parallel vertical sides 16, 16, and a curved bottom 17. The top 18 disposed above the axle is considerably shorter than the bottom 17 and the two are connected together by upwardly-converging end walls 19, 19. Within the casing is a pneumatic cushion 20, fitting the bottom and sides of the casing but out of contact with the top 18 and normally out of contact with the inclined end walls 19. Within the casing is a plunger 21 of a length substantially equal to the length of the top 18, and of a width substantially equal to the distance between the side walls 16. The upper portions of the side walls are provided with inwardly-directed flanges 22 upon opposite sides of the axle, and these fit within notches in the edges of the plunger, so that the latter is guided and its movement restricted. The guides also tend to keep the plunger out of engagement with the inclined end walls 19. The plunger is provided with a depressed central portion 23, entering a corresponding depression formed in the upper surface of the cushion, and the remainder of the plunger extends outwardly and is curved upwardly from this central portion.

The plunger is connected to the spring 14 by a plurality of connecting rods 24 extending through the top 18 of the casing and having coil springs 25 within the casing for limiting the upward movement of the plunger on the rebound after a sudden compression of the cushion. On the upper surface of the top 18, I preferably provide a rubber bumper 26, which may contact with the lower surface of the spring 14 should the cushion be compressed to the maximum extent. One wall of the casing is preferably provided with a detachable section or closure 27, through which the cushion may be removed when deflated, and the cushion carries a suitable valve-controlled nipple 28, through which the cushion may be inflated when in place.

In my improved device, the cushion normally does not engage with the entire surface of the plunger nor with only a small portion of the inclined walls 19, but as pressure is applied, the cushion is compressed and is forced into engagement with a larger portion of the surface of the casing and plunger. As the plunger is depressed under a light load, only the central portion of the cushion is forced downward, but as the pressure increases and an increasing area of the surface of the plunger engages with the cushion, an increased amount of the latter is depressed. Thus the continued downward movement of the plunger 21 is resisted by the increasing pressure in the cushion and also by the increasing area of the surface of the latter which is acted upon.

In order to permit the plunger to move upwardly upon a rebound, the edges of said plunger are preferably cut away to receive the lower portion of the axle 10. In addition to the coil springs 25, I may, if desired, employ an additional bumper of rubber within the depression 23 and adapted to engage with the under side of the axle.

Having thus described my invention, I claim as new and desire to secure by Letters Patent:

1. A shock absorber, comprising a casing having a curved lower surface, upwardly converging end walls, and oppositely-disposed substantially parallel side walls, a pneumatic cushion within said casing, a plunger within said casing and in engagement with the upper surface of said cushion, and guides upon the inner surfaces of said substantially parallel casing walls and in engagement with said plunger for maintaining the latter out of engagement with said upwardly converging end walls.

2. A shock absorber, comprising a casing having a lower surface, upwardly converging end walls, and oppositely-disposed substantially parallel side walls, each of said side walls having an inwardly-directed flange, a pneumatic cushion within said casing, and a plunger in engagement with said cushion and having recesses to receive said flanges and maintain the plunger equi-distant between said converging end walls.

3. In combination, a vehicle having an axle, a spring, a casing depending from said axle, a pneumatic cushion within said casing, a plunger within said casing and in engagement with the upper surface of said cushion, a resilient bumper carried by said casing above said axle and adapted to engage with said spring, a resilient bumper upon said plunger and adapted to engage with the under surface of said axle, guide rods connecting said spring and said plunger, and coil springs encircling said guide rods and in engagement with said plunger and said casing.

In testimony whereof I have signed my name to this specification in the presence of two subscribing witnesses.

GEORGE R. ROGERS.

Witnesses:
GEO. WENDELL BURNS,
E. S. RUE.